US007560415B2

(12) United States Patent
Tsuboi et al.

(10) Patent No.: US 7,560,415 B2
(45) Date of Patent: Jul. 14, 2009

(54) REVERSIBLE MULTICOLOR RECORDING MEDIUM AND RECORDING METHOD USING IT

(75) Inventors: Hisanori Tsuboi, Kanagawa (JP); Noriyuki Kishii, Kanagawa (JP); Kenichi Kurihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 473 days.

(21) Appl. No.: 10/531,339

(22) PCT Filed: Oct. 7, 2003

(86) PCT No.: PCT/JP03/12826

§ 371 (c)(1),
(2), (4) Date: Apr. 14, 2005

(87) PCT Pub. No.: WO2004/041543

PCT Pub. Date: May 21, 2004

(65) Prior Publication Data

US 2005/0225891 A1 Oct. 13, 2005

(30) Foreign Application Priority Data

Jun. 11, 2002 (JP) ............................ 2002-322105

(51) Int. Cl.
*G11B 15/18* (2006.01)

(52) U.S. Cl. ........................ 503/200; 503/202; 503/218; 503/225; 430/334; 360/69

(58) Field of Classification Search .................. 503/200
See application file for complete search history.

(56) References Cited

U.S. PATENT DOCUMENTS

| | | | | |
|---|---|---|---|---|
| 4,529,992 | A | 7/1985 | Ishida et al. | |
| 4,816,367 | A | 3/1989 | Sakojiri et al. | |
| 4,864,024 | A * | 9/1989 | Sato et al. | 544/35 |
| 4,940,689 | A * | 7/1990 | Ito | 503/202 |
| 5,547,500 | A * | 8/1996 | Tsutsui | 106/31.16 |
| 5,548,500 | A * | 8/1996 | MacKay | 362/427 |
| 6,995,116 | B2 * | 2/2006 | Tsuboi et al. | 503/201 |
| 2003/0114304 | A1 * | 6/2003 | Arai et al. | 503/201 |
| 2003/0166467 | A1 * | 9/2003 | Azuma | 503/217 |
| 2004/0115404 | A1 * | 6/2004 | Tsuboi et al. | 428/195.1 |
| 2004/0171485 | A1 * | 9/2004 | Nagai et al. | 503/201 |
| 2006/0276335 | A1 * | 12/2006 | Tsuboi et al. | 503/201 |

FOREIGN PATENT DOCUMENTS

JP 59-89192 5/1984

(Continued)

OTHER PUBLICATIONS

Japanese Office Action dated Jul. 24, 2007.

*Primary Examiner*—Mark F Huff
*Assistant Examiner*—Anna L Verderame
(74) *Attorney, Agent, or Firm*—K&L Gates LLP

(57) ABSTRACT

A reversible multicolor thermal recording medium which is free from fogging and has sharp contrast even after recording and erasing are performed repeatedly, and a recording method using the same are provided.

A reversible multicolor recording medium is provided, which includes recording layers each containing a plurality of reversible thermal coloring compositions having different coloring tones, formed to be separated from and stacked on a surface direction of a supporting substrate; and the plurality of reversible thermal coloring compositions containing light-to-heat transforming materials which absorb infrared rays having different wavelength ranges to generate heat, respectively; wherein an absorption peak wavelength of the light-to-heat transforming material contained in the recording layers becomes the longest wavelength at the layer formed nearest the supporting substrate, and becomes a shorter wavelength as the layer is closer to the surface layer in the stacked order.

7 Claims, 3 Drawing Sheets

FOREIGN PATENT DOCUMENTS

| | | | |
|---|---|---|---|
| JP | 59-089192 | | 5/1984 |
| JP | 61-205182 | | 9/1986 |
| JP | 63-039377 | | 2/1988 |
| JP | 63-319182 | | 12/1988 |
| JP | 02-188293 | | 7/1990 |
| JP | 05-124360 | | 5/1993 |
| JP | 06-079970 | | 3/1994 |
| JP | 06-305247 | | 11/1994 |
| JP | 07-125451 | | 5/1995 |
| JP | 07-188294 | | 7/1995 |
| JP | 07-228048 | | 8/1995 |
| JP | 07-314899 | | 12/1995 |
| JP | 08-058245 | | 3/1996 |
| JP | 08-197853 | | 8/1996 |
| JP | 08-300825 | | 11/1996 |
| JP | 10-157174 | | 6/1998 |
| JP | 11-138997 | | 5/1999 |
| JP | 2000-218839 | | 8/2000 |
| JP | 2001-1645 | | 1/2001 |
| JP | 2001-001645 | | 1/2001 |
| JP | 2001001645 | * | 1/2001 |
| JP | 2001-105733 | | 4/2001 |
| JP | 2002-59654 | | 2/2002 |
| JP | 2002-059654 | | 2/2002 |
| JP | 2003-266941 | | 9/2003 |
| WO | WO 02/096663 | * | 12/2002 |

* cited by examiner

REVERSIBLE MULTICOLOR RECORDING MEDIUM AND RECORDING METHOD USING IT

CROSS REFERENCE TO RELATED APPLICATION

The present application claims priority to Japanese Patent Document No. P2002-322105 filed on Nov. 6, 2002, the disclosure of which is herein incorporated by reference.

BACKGROUND OF THE INVENTION

The present invention relates to a reversible multicolor recording medium for recording image or data, and a recording method using the same.

Recently, the necessity of a rewritable recording technique is strongly recognized from the viewpoint of protecting the global environment. In accordance with the progress of computer network techniques, communication techniques, OA machines, recording media, and memory media, paperless technology is being spread at the office and home.

Recording media onto which information can be recorded and erased reversibly utilizing heat, i.e., so-called reversible thermal recording media are one of display media as a substitute for printed materials, and, as a variety of prepaid cards, point cards, credit cards, and IC cards spread, the reversible thermal recording media have been practically used in the applications in which the balance or other recorded information is needed to be visible or readable, and further they are being brought into practical use in the applications of copying machine and printer.

The reversible thermal recording medium and a recording method using the same are described in, for example, patent documents 1 to 4 below. These are so-called low-molecular substance dispersion type recording media, that is, recording media containing an organic low-molecular weight substance dispersed in a resin matrix, and the light scattering on the media is changed by experiencing high-temperature conditions to change the recording layer to an opaque or transparent state. Therefore, these media have a drawback in that the contrast between an image formed portion and an image unformed portion is unsatisfactory, and therefore, only the media improved in the contract by providing a reflective layer under the recording layer have been put into practical use.

On the other hand, for example, patent documents 5 to 9 below disclose a leuco dye type recording medium, that is, a recording medium having a recording layer containing a leuco dye, which is an electron donating color-forming compound, and a develop/subtractive agent dispersed in a resin matrix, and a recording method using the same. In the medium and method, as the develop/subtractive agent, an amphoteric compound having an acidic group for developing a leuco dye and a basic group for decoloring the colored leuco dye, or a phenolic compound having long-chain alkyl is used. The recording medium and recording method utilize coloring of the leuco dye itself, and therefore, the contrast and recognizability are favorable, as compared to those of the low-molecular substance dispersion type recording medium, and they are recently being widely practically used.

In the conventional techniques disclosed in the above patent documents, only two colors, specifically, the color of the material for the matrix, i.e., color of the base and the color changed by heat can be displayed. However, in recent years, for improving the recognizability and appearance, there are increasing strong demands of multicolor image display and recording of various data with color identification.

For meeting the demands, a number of recording methods have been proposed in which the above-mentioned conventional technique is applied and multicolor image display is achieved.

Patent documents 10 to 12 below disclose a recording medium in which layers or particles having different colors are render visible or hidden by a low-molecular substance dispersion type recording layer to achieve multicolor display, and a recording method using the same. However, in the recording medium having such a structure, the recording layer cannot completely hide the colors of the underlying layers and the color of the matrix is visible, so that a high contrast cannot be obtained.

In patent documents 13 and 14 below, there is disclosure concerning reversible thermal multicolor recording media using a leuco dye, but these recording media have repeating units having different hues in the surface, and therefore the area ratio of the individual hues to the actually recorded portion is small. Thus, there is a problem in that the recorded image is very dark or low in contrast.

In patent documents 15 to 23 below, there is disclosure concerning reversible thermal multicolor recording media having a structure in which recording layers using leuco dyes having different coloring temperatures, decoloring temperatures, and cooling rates are formed so that they are separated and independent from one another.

However, the recording media have problems in that temperature control using a recording heat source, such as a thermal head, is difficult and a favorable contrast cannot be obtained, so that the occurrence of fogging cannot be avoided. Further, it is very difficult to control the recording of multicolor, i.e., three colors or more merely by changing the heating temperature using a thermal head or the like and/or the cooling rate after the heating.

On the other hand, in patent document 24 below, there is disclosure concerning a recording method using a reversible thermal multicolor recording medium having a structure in which recording layers using leuco dyes are formed so that they are separated and independent from one another, in which only an arbitrary recording layer is heated and colored by light-to-heat transformation using laser. In this method, only an arbitrary recording layer can be colored by the effect of the wavelength selectivity of the light-to-heat transforming layer, possibly solving the problem of fogging accompanying the conventional reversible multicolor recording media.

However, in the above patent documents, no studies have been made on the wavelength of laser absorption and the order of the stacked light-to-heat transforming layers, and not only can the recording medium not always be surely colored with only a desired color, but also the problem of fogging has not yet been solved.

Patent Document 1: Japanese Patent Application Publication No: Sho 54-119377;

Patent Document 2: Japanese Patent Application Publication No: Sho 55-154198;

Patent Document 3: Japanese Patent Application Publication No: Sho 63-39377;

Patent Document 4: Japanese Patent Application Publication No: Sho 63-41186;

Patent Document 5: Japanese Patent Application Publication No: Hei 2-188293;

Patent Document 6: Japanese Patent Application Publication No: Hei 2-188294;

Patent Document 7: Japanese Patent Application Publication No: Hei 5-124360;

Patent Document 8: Japanese Patent Application Publication No: Hei 7-108761;

Patent Document 9: Japanese Patent Application Publication No: Hei 7-188294;

Patent Document 10: Japanese Patent Application Publication No: Hei 5-62189;

Patent Document 11: Japanese Patent Application Publication No: Hei 8-80682;

Patent Document 12: Japanese Patent Application Publication No: 2000-198275;

Patent Document 13: Japanese Patent Application Publication No: Hei 8-58245;

Patent Document 14: Japanese Patent Application Publication No: 2000-25338;

Patent Document 15: Japanese Patent Application Publication No: Hei 6-305247;

Patent Document 16: Japanese Patent Application Publication No: Hei 6-328844;

Patent Document 17: Japanese Patent Application Publication No: Hei 6-79970;

Patent Document 18: Japanese Patent Application Publication No: Hei 8-164669;

Patent Document 19: Japanese Patent Application Publication No: Hei 8-300825;

Patent Document 20: Japanese Patent Application Publication No: Hei 9-52445;

Patent Document 21: Japanese Patent Application Publication No: Hei 11-138997;

Patent Document 22: Japanese Patent Application Publication No: 2001-162941;

Patent Document 23: Japanese Patent Application Publication No: 2002-59654; and

Patent Document 24: Japanese Patent Application Publication No: 2001-1645.

As mentioned above, there are strong demands on the multicolor thermal recording and studies are vigorously conducted, but a recording medium or recording method having satisfactory recording properties from a practical point of view has not yet been found.

SUMMARY OF THE INVENTION

The present invention provides in an embodiment a recording method using a reversible multicolor thermal recording medium which is advantageous not only in that the recording medium is free from fogging and has sharp coloring/decoloring properties and high contrast as well as practically satisfactory image stability, but also in that the recording medium can be colored with an arbitrary tone and decolored repeatedly.

The reversible multicolor recording medium of the present invention includes: recording layers each containing a plurality of reversible thermal coloring compositions having different coloring tones, formed to be separated from and stacked on a surface direction of a supporting substrate: and the plurality of reversible thermal coloring compositions containing light-to-heat transforming materials which absorb infrared rays having different wavelength ranges to generate heat, respectively; wherein an absorption peak wavelength of the light-to-heat transforming material contained in the recording layers becomes the longest wavelength at the layer formed nearest the supporting substrate, and becomes a shorter wavelength as the layer is closer to the surface layer in stacked order.

The recording method for reversible multicolor recording medium of the present invention is a recording method using a reversible multicolor recording medium, the reversible multicolor recording medium having: recording layers each containing a plurality of reversible thermal coloring compositions having different coloring tones, formed separated from and stacked on a surface direction of a supporting substrate; the reversible thermal coloring compositions containing light-to-heat transforming materials which absorb infrared rays having different wavelength ranges to generate heat, respectively; and an absorption peak of wavelength of the light-to-heat transforming material contained in the recording layer becomes the longest wavelength at the layer formed nearest the supporting substrate, and becomes a shorter wavelength as the layer is closer to the surface layer in the stacked order; wherein the recording method records image information is characterized by including the steps of: setting the whole recording layers in a decolored state preliminarily by performing a heat treatment; exposing the recording layers by irradiating with an infrared ray having a selected wavelength range corresponding to a selected recording layer, in accordance with predetermined image information; and allowing the recording layer to be selectively colored by generating heat.

In addition, the recording method for reversible multicolor recording medium of the present invention is a recording method using a reversible multicolor recording medium, the reversible multicolor recording medium having: recording layers each containing a plurality of reversible thermal coloring compositions having different coloring tones, formed separated from and stacked on a surface direction of a supporting substrate; the reversible thermal coloring compositions containing light-to-heat transforming materials which absorb infrared rays having different wavelength ranges to generate heat, respectively; and an absorption peak of wavelength of the light-to-heat transforming material contained in the recording layers becomes the longest wavelength at the layer formed nearest the supporting substrate, and becomes a shorter wavelength as the layer is closer to the surface layer in the stacked order; wherein the recording method records image information is characterized by including the steps of: setting the whole recording layers in a colored state preliminarily by performing a heat treatment; exposing the recording layers by irradiating with an infrared ray having a selected wavelength range corresponding to a selected recording layer, in accordance with predetermined image information; and allowing the recording layer to be selectively decolored by generating heat.

In the present invention, irradiation of an infrared ray having a selected wavelength selectively allows an arbitrary recording layer to generate heat, so that sharp, reversible conversion of the recording layer between a colored state and a decolored state can be achieved, and further, even after repeatedly recording and erasing information on the recording medium, the occurrence of fogging or color failure can be avoided.

Additional features and advantages of the present invention are described in, and will be apparent from, the following Detailed Description of the Invention and the figures.

DETAILED DESCRIPTION OF THE INVENTION

The present invention relates to a reversible multicolor recording medium for recording image or data, and a recording method using the same.

Hereinbelow, the embodiments of the present invention will be described in detail with reference the accompanying drawings, but the reversible multicolor recording medium of the present invention and the recording method using the same are not limited to the following examples.

Figure 1:
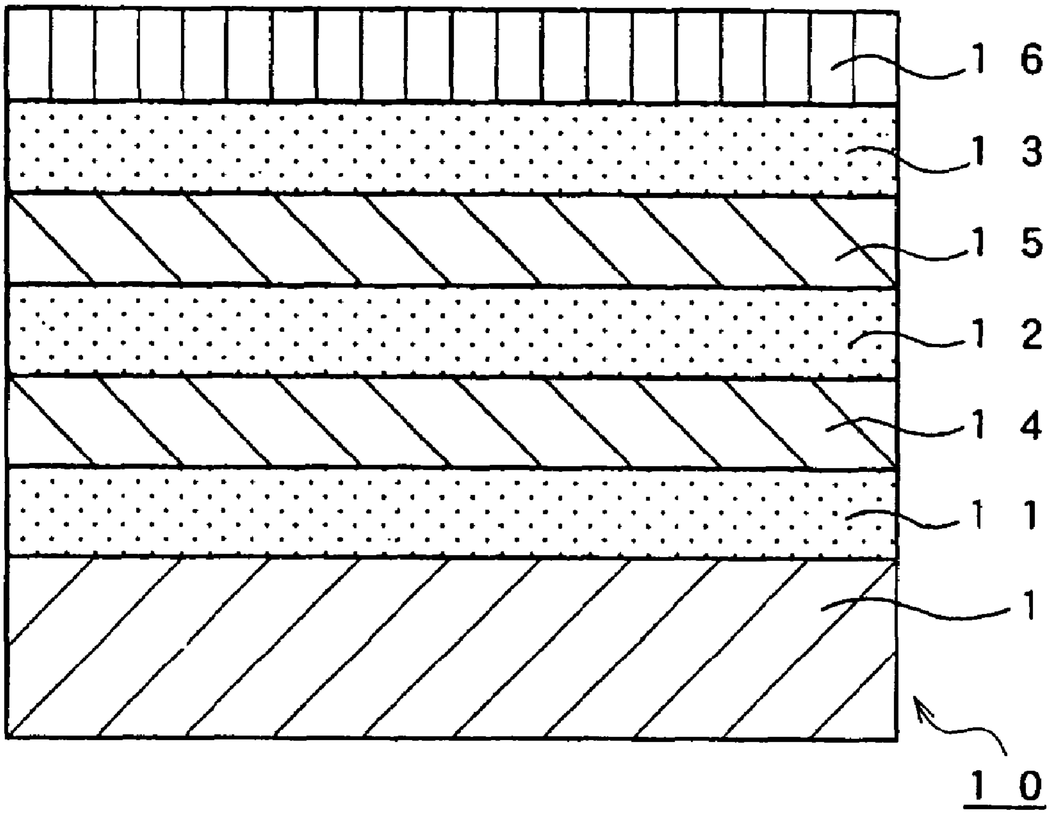
FIG. 1 is a diagrammatic cross-sectional view of one example of the reversible multicolor recording medium of the present invention.

FIG. 1 is a diagrammatic cross-sectional view of the reversible multicolor recording medium of the present invention.

A reversible multicolor recording medium 10 has a structure such that a first recording layer 11, a second recording layer 12, and a third recording layer 13 are stacked on one another respectively through heat insulating layers 14, 15 on a supporting substrate 1, and a protective layer 16 is formed as the uppermost layer.

In the supporting substrate 1, any conventionally known materials can be used as long as they have favorable heat resistance and favorable planar dimensional stability. For example, it can be appropriately selected from polymer materials, such as polyester and rigid vinyl chloride; glass materials; metallic materials, such as stainless steel; and materials, such as paper. In applications other than the application requiring transparency, e.g., overhead projector, for improving the recognizability of the information recorded on the reversible multicolor recording medium 10 finally obtained, it is preferred that the supporting substrate 1 is formed from a material having a white or metallic color and having a higher reflectance with respect to visible light.

The first to third recording layers 11 to 13 are formed using a material which can be recorded stably and repeatedly and which can control the decolored state and colored state, and the first to third recording layers 11 to 13 respectively contain light-to-heat transforming materials which respectively absorb infrared rays having different wavelengths to generate heat.

The first to third recording layers 11 to 13 are individually formed by application of a composition containing, for example, a leuco dye and a develop/subtractive agent dispersed in a resin matrix.

The first to third recording layers 11 to 13 are formed using respectively predetermined leuco dyes according to the desired colors. For example, when the first to third recording layers 11 to 13 are colored, respectively, three primary colors, a full color image can be formed on the reversible multicolor recording medium 10 as a whole.

As the leuco dye, existing leuco dyes for thermal recording paper and the like can be used. As the develop/subtractive agent, organic acids having a long-chain alkyl group conventionally used as develop/subtractive agents (described in Japanese Patent Application Publication Nos. Hei 5-124360, Hei 7-108761, Hei 7-188294, 2001-105733, 2001-113829, and the like) and the like can be used.

The first to third recording layers 11 to 13 respectively contain infrared absorbing dyes having absorptions respectively in different wavelength ranges as mentioned above, and, in the reversible multicolor recording medium 10 shown in FIG. 1, the first recording layer 11 contains a light-to-heat transforming material which absorbs an infrared ray having a wavelength $\lambda_1$ to generate heat, the second recording layer 12 contains a light-to-heat transforming material which absorbs an infrared ray having a wavelength $\lambda_2$ to generate heat, and the third recording layer 13 contains a light-to-heat transforming material which absorbs an infrared ray having a wavelength $\lambda_3$ to generate heat.

As the light-to-heat transforming materials contained in the first to third recording layers 11 to 13, there can be used phthalocyanine dyes, cyanine dyes, metal complex dyes, diimmonium dyes, aminium dyes, and iminium dyes, which are generally used as near infrared absorbing dyes having almost no absorption in a visible light range. Further, for allowing only an arbitrary light-to-heat transforming material to generate heat, it is preferred to select a combination of the materials so that the absorption bands of the light-to-heat transforming materials are individually narrow and they do not overlap. From this, when the recording layer contains a cyanine dye or phthalocyanine dye having a sharp absorption spectrum, excluding the first recording layer 11 formed nearest the supporting substrate 1, the occurrence of fogging can be prevented.

Examples of resins constituting the first to third recording layers 11 to 13 include polyvinyl chloride, polyvinyl acetate, vinyl chloride-vinyl acetate copolymers, ethyl cellulose, polystyrene, styrene copolymers, phenoxy resins, polyester, aromatic polyester, polyurethane, polycarbonate, polyacrylate, polymethacrylate, acrylic acid copolymers, maleic acid polymers, polyvinyl alcohol, modified polyvinyl alcohol, hydroxyethyl cellulose, carboxymethyl cellulose, and starch. If necessary, an additive, such as an ultraviolet absorber, may be added to the resin.

The first to third recording layers 11 to 13 can be formed by applying to the respectively predetermined surfaces a composition prepared by dissolving using a solvent or dispersing in the resin the leuco dye, the develop/subtractive agent, the light-to-heat transforming material, and an additive.

It is desired that the first to third recording layers 11 to 13 are formed so that the individual thickness becomes about 1 to 20 μm, further preferably about 1.5 to 15 μm. When the thickness of the recording layers is too small, a satisfactory coloring density cannot be obtained. On the other hand, when the thickness is too large, the heat capacity of the recording layer is increased, so that the coloring properties or decoloring properties may deteriorate.

It is desired that, between the first recording layer 11 and the second recording layer 12, and between the second recording layer 12 and the third recording layer 13, light-transmitting heat insulating layers 14, 15 are respectively formed. Thus, heat conduction between the adjacent recording layers can be avoided, obtaining an effect of preventing the occurrence of so-called fogging.

The heat insulating layers 14, 15 can be formed using a conventionally known light-transmitting polymer. Examples include polyvinyl chloride, polyvinyl acetate, vinyl chloride-vinyl acetate copolymers, ethyl cellulose, polystyrene, styrene copolymers, phenoxy resins, polyester, aromatic polyester, polyurethane, polycarbonate, polyacrylate, polymethacrylate, acrylic acid copolymers, maleic acid polymers, polyvinyl alcohol, modified polyvinyl alcohol, hydroxyethyl cellulose, carboxymethyl cellulose, and starch. If necessary, an additive, such as an ultraviolet absorber, may be added to the polymer.

In the heat insulating layers 14, 15, a light-transmitting inorganic film can be used. For example, it is preferred to use porous silica, alumina, titania, carbon, or a composite thereof since the heat conductivity of the heat insulating layers is lowered. These layers can be formed by a sol-gel process in which a film can be formed from a liquid layer.

It is desired that the heat insulating layers 14, 15 are formed so that the individual thickness becomes about 3 to 100 μm, further preferably about 5 to 50 μm. When the thickness of the heat insulating layers is too small, a satisfactory heat insulation effect cannot be obtained, and, when the thickness is too large, the heat conductivity or light transmission properties of the heat insulating layers deteriorate during the uniformly heating of the whole of the recording medium, which will be mentioned below.

The protective layer 16 can be formed using a conventionally known ultraviolet curing resin or thermosetting resin, and it has desirably a thickness of 0.1 to 20 μm, further desirably about 0.5 to 5 μm. When the thickness of the protective layer 16 is too small, a satisfactory protection effect cannot be obtained, and, when the thickness is too large, a problem occurs in that satisfactory heat conduction cannot be achieved during the uniformly heating of the whole of the recording medium.

Next, the principles of the multicolor recording are described using the reversible multicolor recording medium 10 shown in FIG. 1.

First, the first principle of the multicolor recording is described.

The entire surface of the reversible multicolor recording medium 10 shown in FIG. 1 is heated to a temperature, e.g., about 120° C. at which the individual recording layers are decolored, so that each of the first to third recording layers 11 to 13 is preliminarily in a decolored state. That is, in this instance, the color of the supporting substrate 1 is visible.

Then, an arbitrary portion of the reversible multicolor recording medium 10 is irradiated with an infrared ray having arbitrarily selected wavelength and power using, e.g., a semiconductor laser.

For example, for coloring the first recording layer 11, the recording medium is irradiated with an infrared ray having a wavelength $\lambda_1$ at such energy that the first recording layer 11 reaches its coloring temperature to allow the light-to-heat transforming material to generate heat, and the electron donating color-forming compound and the electron donating develop/subtractive agent undergo a coloring reaction, so that the irradiated portion is colored.

Similarly, for coloring the second recording layer 12 or the third recording layer 13, the recording medium is irradiated with an infrared ray having a wavelength $\lambda_2$ or $\lambda_3$ at such energy that the second recording layer 12 or the third recording layer 13 reaches each coloring temperature to allow the light-to-heat transforming material to generate heat, so that the irradiated portion can be colored. Thus, an arbitrary portion of the reversible multicolor recording medium 10 can be colored, enabling full color image formation and various information recording.

In addition, the thus colored recording layer is further irradiated with an infrared ray having an arbitrary wavelength at such energy that the first to third recording layers 11 to 13 reach each decoloring temperature to allow each light-to-heat transforming material to generate heat, and the electron donating color-forming compound and the electron donating develop/subtractive agent undergo a decoloring reaction, so that the recording layer can be decolored.

Further, when part of the reversible multicolor recording medium 10 is colored or decolored as described above, the whole of the reversible multicolor recording medium 10 is uniformly heated to a temperature, e.g., 120° C. at which all the recording layers are decolored, so that the recorded information or image can be erased, and a sequence of the above operations is repeated to make it possible to achieve recording repeatedly.

Next, the second principle of the multicolor recording is described.

The entire surface of the reversible multicolor recording medium 10 shown in FIG. 1 is heated to a temperature, e.g., as high as about 200° C. at which the individual recording layers are colored, and then cooled so that each of the first to third recording layers 11 to 13 is preliminarily in a colored state.

Then, an arbitrary portion of the reversible multicolor recording medium 10 is irradiated with an infrared ray having arbitrarily selected wavelength and power using, e.g., a semiconductor laser.

For example, for decoloring the first recording layer 11, the recording medium is irradiated with an infrared ray having a wavelength $\lambda_1$ at such energy that the first recording layer 11 is decolored to allow the light-to-heat transforming material to generate heat, so that the recording layer 11 is in a decolored state. Similarly, for decoloring the second recording layer 12 or the third recording layer 13, the recording medium is irradiated with an infrared ray having a wavelength $\lambda_2$ or $\lambda_3$ at such energy that the second recording layer 12 or the third recording layer 13 reaches each decoloring temperature to allow the light-to-heat transforming material to generate heat, so that the irradiated portion can be decolored. Thus, an arbitrary portion of the reversible multicolor recording medium 10 can be decolored, enabling full color image formation and various information recording.

In addition, the thus decolored recording layer is further irradiated with an infrared ray having an arbitrary wavelength at such energy that the first to third recording layers 11 to 13 reach each coloring temperature to allow each light-to-heat transforming material to generate heat, and the electron donating color-forming compound and the electron donating develop/subtractive agent undergo a coloring reaction, so that the recording layer can be colored.

Further, when part of the reversible multicolor recording medium 10 is colored or decolored as described above, the whole of the reversible multicolor recording medium 10 is uniformly heated to a temperature, e.g., 200° C. at which all the recording layers are colored, and then cooled, so that the recorded information or image can be erased, and a sequence of the above operations is repeated to make it possible to achieve recording repeatedly.

A recording method for the reversible multicolor recording medium 10 of the present invention is appropriately selected from the above-described recording methods depending on the properties of the recording layers and the performance of the recording light source.

For example, the recording layer may be formed either as a so-called positive layer which is in a colored state by heating and is decolored at a temperature lower than that heating temperature, or as a so-called negative layer which is in a decolored state at a high temperature and is colored at a temperature lower than that temperature (e.g., Japanese Patent Application Publication No. Hei 8-197853).

Next, the order of the stacked recording layers constituting the reversible multicolor recording medium 10 of the present invention is described.

Figure 2:
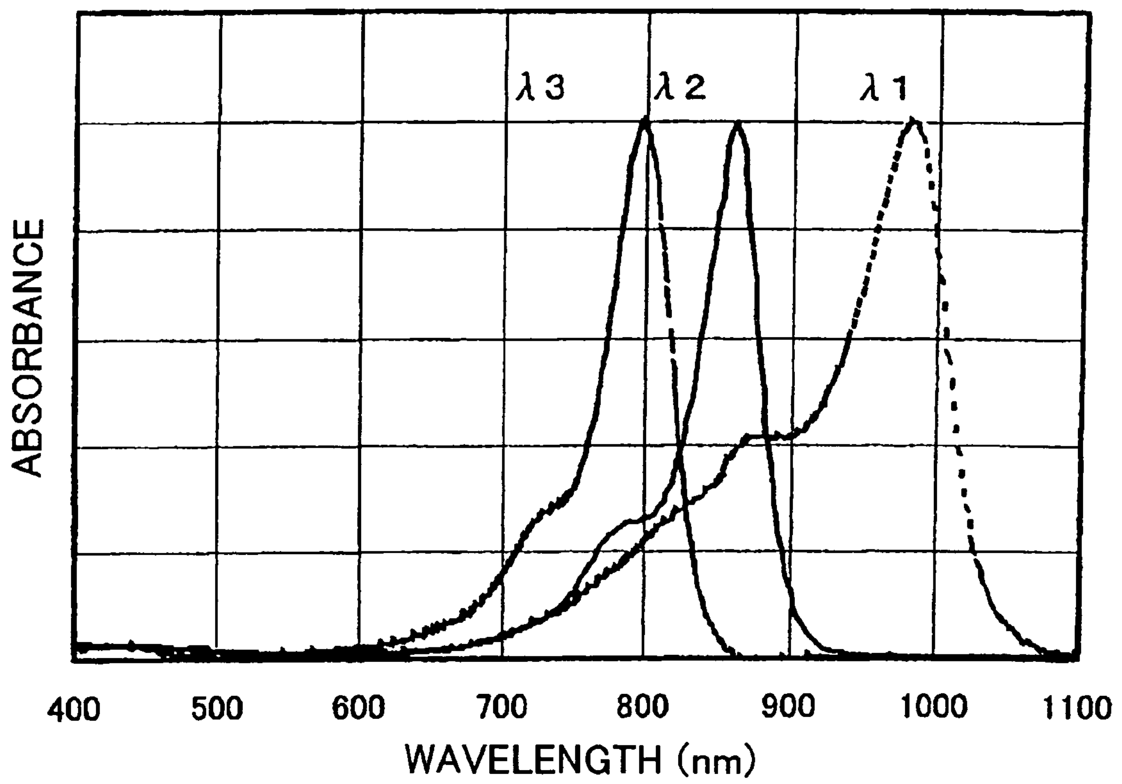
FIG. 2 shows absorption spectra of cyanine dyes.

FIG. 2 shows absorption spectra of the cyanine dyes as examples of the light-to-heat transforming materials contained respectively in the first recording layer 11 to the third recording layer 13.

As shown in the figure, each absorption spectrum is very sharp in the absorption peak on the longer wavelength side, but it is relatively broad on the shorter wavelength side.

As shown in FIG. 2, the infrared rays emitted are under the conditions for wavelength: $\lambda_3<\lambda_2<\lambda_1$. The reversible multicolor recording medium 10 of the present invention comprises, as shown in FIG. 1, the first recording layer 11 to the third recording layer 13 which are successively stacked on the supporting substrate 1, and which have absorption peak wavelengths $\lambda_1$, $\lambda_2$, and $\lambda_3$, respectively. Specifically, the recording layers are stacked on one another so that the recording layer closer to the side of the supporting substrate 1 contains a light-to-heat transforming material (infrared absorber) having a longer wavelength of absorption peak.

In the reversible multicolor recording medium having the above structure, when the recording medium is irradiated with an infrared ray having a wavelength $\lambda_3$, the third recording layer 13 solely absorbs the infrared ray to generate heat, so that only the third recording layer 13 can be colored. Similarly, when the recording medium is irradiated with an infrared ray having a wavelength $\lambda_2$ longer than $\lambda_3$, the third recording layer 13 does not absorb the infrared ray but transmits it, and the second recording layer 12 solely absorbs the infrared ray to generate heat, so that only the second recording layer 12 can be colored.

When the recording medium is irradiated with an infrared ray having a wavelength $\lambda_1$ longer than $\lambda_2$ and $\lambda_3$, neither the third recording layer 13 nor the second recording layer 12 absorbs the infrared ray but both transmit it, and the first recording layer 11 solely absorbs the infrared ray to generate heat, so that only the first recording layer 11 can be colored.

Figure 3:
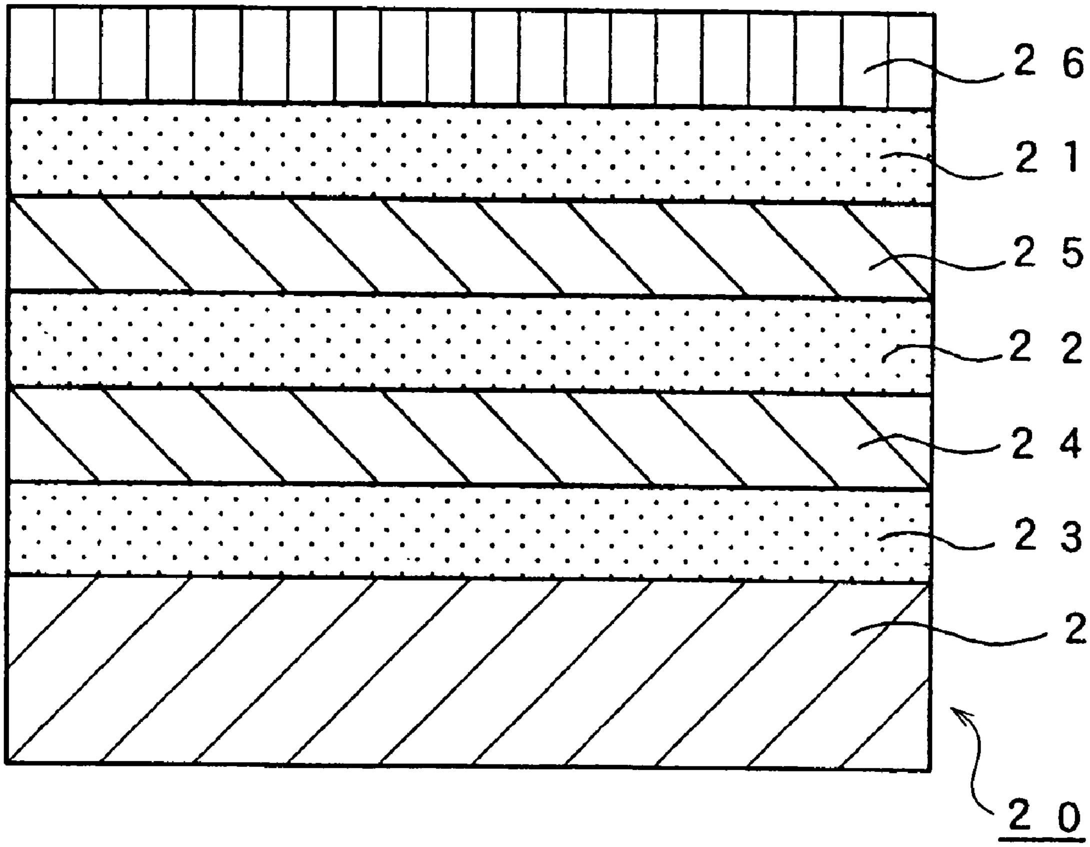
FIG. 3 is a diagrammatic cross-sectional view of the reversible multicolor recording medium prepared in Comparative Example 1.

In contrast, a recording medium 20 shown in FIG. 3 is prepared wherein the recording medium 20 includes a first recording layer 21 to a third recording layer 23 having absorption peak wavelengths $\lambda_1$, $\lambda_2$, and $\lambda_3$, respectively ($\lambda_3<\lambda_2<\lambda_1$), which are stacked on a supporting substrate 2 in the order of the third recording layer 23, the second recording layer 22, and the first recording layer 21 from the side of the supporting substrate 2 so that the recording layer closer to the side of the supporting substrate 2 contains a light-to-heat transforming material (infrared absorber) having a shorter wavelength of absorption peak.

When the recording medium 20 is irradiated with an infrared ray having a wavelength $\lambda_1$, the first recording layer 21 solely absorbs the infrared ray to generate heat, so that only the first recording layer 21 can be colored.

However, when the recording medium is irradiated with an infrared ray having a wavelength $\lambda_2$, as shown in FIG. 2, because the absorption spectrum of a cyanine dye or phthalocyanine dye is relatively broad in the absorption peak on the shorter wavelength side, the infrared ray does not reach the second recording layer 22 but it is absorbed by the upper first recording layer 21, so that the first recording layer 21 is disadvantageously colored.

Similarly, when the recording medium is irradiated with an infrared ray having a wavelength $\lambda_3$, the infrared ray does not reach the third recording layer 23 but it is absorbed by the upper first recording layer 21 and second recording layer 22, so that the first and second recording layers are disadvantageously colored.

Thus, when a recording layer containing a light-to-heat transforming material (infrared absorber) having a longer wavelength of absorption peak is stacked on a recording layer containing a light-to-heat transforming material (infrared absorber) having a shorter wavelength of absorption peak, a desired recording layer cannot be solely colored, causing fogging.

As mentioned above, when a near infrared absorbing dye is used as the light-to-heat transforming material, the shape of the absorption spectrum of the dye and the order of the stacked recording layers containing the light-to-heat transforming materials are taken into consideration, the occurrence of fogging in the color tone can be prevented by stacking the recording layers on one another so that the recording layer closer to the side of the supporting substrate contains a light-to-heat transforming material (infrared absorber) having a longer wavelength of absorption peak.

In addition, from the above, it is preferred that a cyanine dye or phthalocyanine dye having an absorption spectrum sharp in the absorption peak on the longer wavelength side is used in the recording layers, excluding the recording layer formed nearest the supporting substrate.

EXAMPLES

Hereinbelow, the present invention will be described in detail with reference to the following Examples and Comparative Examples, but the reversible multicolor recording medium of the present invention and the recording method using the same are not limited to the following Examples.

Example 1

In this Example, a recording medium having reversible recording layers of so-called three layer shown in FIG. 1 was prepared in which a first recording layer 11, a heat insulating layer 14, a second recording layer 12, a heat insulating layer 15, a third recording layer 13, and a protective layer 16 are successively stacked on one another on a supporting substrate 1.

As the supporting substrate 1, a white polyethylene terephthalate substrate having a thickness of 1 mm was prepared. Then, the composition shown below was applied onto the supporting substrate 1 by means of a wire bar, and dried by heating at 110° C. for 5 minutes to form the first recording layer 11 having a thickness of 6 μm and being capable of being colored cyan.

The absorbance of the first recording layer 11 at a wavelength of 980 nm was 1.0.

(Composition)

Leuco dye {H-3035 ([Chemical formula 1] below); manufactured and sold by Yamada Chemical Co., Ltd.}: 1 Part by weight

[Chemical formula 1]

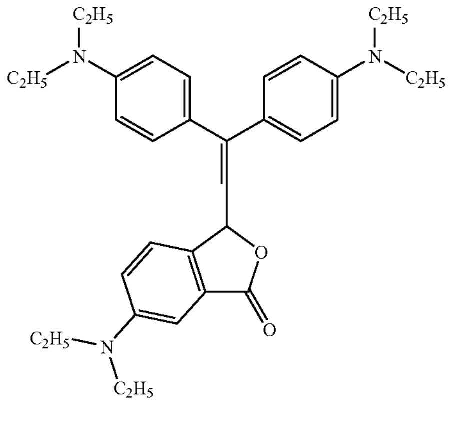

Develop/subtractive agent (substance represented by [Chemical formula 2] below): 4 Parts by weight

[Chemical formula 2]

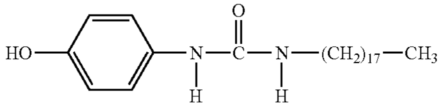

Vinyl chloride-vinyl acetate copolymer: 10 Parts by weight {vinyl chloride: 90%; vinyl acetate: 10%; average molecular weight (M.W.): 115,000}

Cyanine infrared absorbing dye: 0.30 Part by weight (SDA8956; manufactured and sold by H. W. SANDS; absorption wavelength peak in the recording layer: 980 nm)

Tetrahydrofuran (THF): 140 Parts by weight

An aqueous solution of polyvinyl alcohol was applied onto the above-formed first recording layer 11 and dried to form the heat insulating layer 14 having a thickness of 20 μm.

The composition shown below was applied onto the heat insulating layer 14 by means of a wire bar, and dried by heating at 110° C. for 5 minutes to form the second recording layer 12 having a thickness of 6 μm and being capable of being colored magenta.

The absorbance of the second recording layer 12 at a wavelength of 860 nm was 1.0.

(Composition)

Leuco dye {Red DCF ([Chemical formula 3] below); manufactured and sold by HODOGAYA CHEMICAL CO., LTD.}: 2 Parts by weight

[Chemical formula 3]

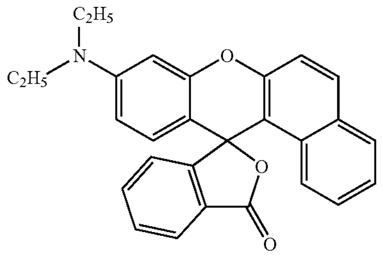

Develop/subtractive agent (substance represented by [Chemical formula 4] below): 4 Parts by weight

[Chemical formula 4]

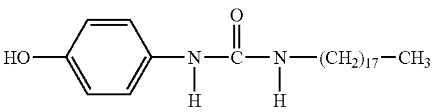

Vinyl chloride-vinyl acetate copolymer: 10 Parts by weight (vinyl chloride: 90%; vinyl acetate: 10%; M.W.: 115,000)

Cyanine infrared absorbing dye: 0.12 Part by weight (NK-5706; manufactured and sold by HAYASHIBARA BIOCHEMICAL LABORATORIES, INC.; absorption wavelength peak in the recording layer: 860 nm)

Tetrahydrofuran (THF): 140 Parts by weight

An aqueous solution of polyvinyl alcohol was applied onto the above-formed second recording layer 12 and dried to form the heat insulating layer 15 having a thickness of 20 μm.

The composition shown below was applied onto the heat insulating layer 15 by means of a wire bar, and dried by heating at 110° C. for 5 minutes to form the third recording layer 13 having a thickness of 6 μm and being capable of being colored yellow.

The absorbance of the third recording layer 13 at a wavelength of 795 nm was 1.0.

(Composition)

Leuco dye (Fluoran compound; $\lambda_{max}$=490 nm): 2 Parts by weight

Develop/subtractive agent (substance represented by [Chemical formula 5] below): 4 Parts by weight

[Chemical formula 5]

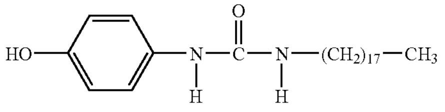

Vinyl chloride-vinyl acetate copolymer: 10 Parts by weight (vinyl chloride: 90%; vinyl acetate: 10%; M.W.: 115,000)

Cyanine infrared absorbing dye: 0.08 Part by weight (CY-10; manufactured and sold by Nippon Kayaku Co., Ltd.; absorption wavelength peak in the recording layer: 795 nm)

Tetrahydrofuran (THF): 140 Parts by weight

The protective layer 16 having a thickness of about 2 μm was formed on the third recording layer 13 using an ultraviolet curing resin to prepare a desired reversible multicolor recording medium 10.

The thus prepared reversible multicolor recording medium 10 was uniformly heated using a ceramic bar heated to 120° C. go that the first to third recording layers 11 to 13 were in a decolored state, and then used as a sample.

Example 2

The reversible multicolor recording medium 10 prepared in Example 1 above was heated using a ceramic bar heated to 180° C. and then cooled so that each of the first recording layer 11, the second recording layer 12, and the third recording layer 13 was preliminarily colored, and then used as a sample.

Comparative Example 1

In this Example, substantially the same recording medium as the reversible multicolor recording medium 10 prepared in Example 1 was prepared except that the order of the stacked recording layers containing near infrared absorbing dyes was changed.

FIG. 3 is a diagrammatic cross-sectional view of the reversible multicolor recording medium in the present Comparative Example.

As a supporting substrate 2, a white polyethylene terephthalate substrate having a thickness of 1 mm was prepared.

Then, the composition shown below was applied onto the supporting substrate 2 by means of a wire bar, and dried by heating at 110° C. for 5 minutes to form a third recording layer 23 having a thickness of 6 μm and being capable of being colored cyan.

The absorbance of the third recording layer 23 at a wavelength of 795 nm was 1.0.

(Composition)

Leuco dye {H-3035 ([Chemical formula 6] below); manufactured and sold by Yamada Chemical Co., Ltd.}: 1 Part by weight

[Chemical formula 6]

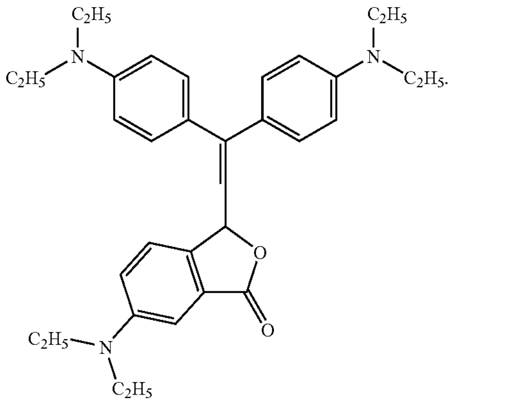

Develop/subtractive agent (substance represented by [Chemical formula 7] below): 4 Parts by weight

[Chemical formula 7]

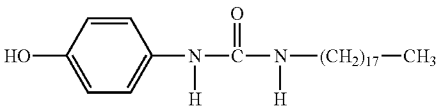

Vinyl chloride-vinyl acetate copolymer: 10 Parts by weight

{vinyl chloride: 90%; vinyl acetate: 10%; average molecular weight (M.W.): 115,000}

Cyanine infrared absorbing dye: 0.08 Part by weight (CY-10; manufactured and sold by Nippon Kayaku Co., Ltd.; absorption wavelength peak in the recording layer: 795 nm)

Tetrahydrofuran (THF): 140 Parts by weight

An aqueous solution of polyvinyl alcohol was applied onto the above-formed third recording layer 23 and dried to form a heat insulating layer 24 having a thickness of 20 μm.

The composition shown below was applied onto the heat insulating layer 24 by means of a wire bar, and dried by heating at 110° C. for 5 minutes to form a second recording layer 22 having a thickness of 6 μm and being capable of being colored magenta.

The absorbance of the second recording layer 22 at a wavelength of 860 nm was 1.0.

(Composition)

Leuco dye {Red DCF ([Chemical formula 8] below); manufactured and sold by HODOGAYA CHEMICAL CO., LTD.}: 2 Parts by weight

[Chemical formula 8]

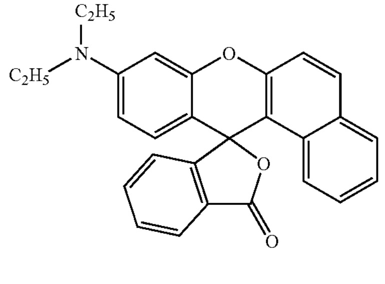

Develop/subtractive agent (substance represented by [Chemical formula 9] below): 4 Parts by weight

[Chemical formula 9]

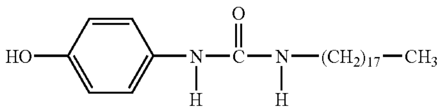

Vinyl chloride-vinyl acetate copolymer: 10 Parts by weight (vinyl chloride: 90%; vinyl acetate: 10%; M.W.: 115,000)

Cyanine infrared absorbing dye: 0.12 Part by weight (NK-5706; manufactured and sold by HAYASHIBARA BIOCHEMICAL LABORATORIES, INC.; absorption wavelength peak in the recording layer: 860 nm)

Tetrahydrofuran (THF): 140 Parts by weight

An aqueous solution of polyvinyl alcohol was applied onto the above-formed second recording layer 22 and dried to form a heat insulating layer 25 having a thickness of 20 μm.

The composition shown below was applied onto the heat insulating layer 25 by means of a wire bar, and dried by heating at 110° C. for 5 minutes to form a first recording layer 21 having a thickness of 6 μm and being capable of being colored yellow.

The absorbance of the first recording layer 21 at a wavelength of 980 nm was 1.0.

(Composition)

Leuco dye (Fluoran compound; $\lambda_{max}$=490 nm): 2 Parts by weight

Develop/subtractive agent (substance represented by [Chemical formula 10] below): 4 Parts by weight

[Chemical formula 10]

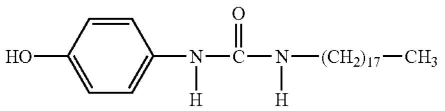

Vinyl chloride-vinyl acetate copolymer: 10 Parts by weight (vinyl chloride: 90%; vinyl acetate: 10%; M.W.: 115,000)

Cyanine infrared absorbing dye: 0.30 Part by weight (SDA8956; manufactured and sold by H. W. SANDS; absorption wavelength peak in the recording layer: 980 nm)

Tetrahydrofuran (THF): 140 Parts by weight

A protective layer 26 having a thickness of about 2 μm was formed on the first recording layer 21 using an ultraviolet curing resin to prepare a desired reversible multicolor recording medium 20.

The thus prepared reversible multicolor recording medium was uniformly heated using a ceramic bar heated to 120° C. so that the first recording layer 21, the second recording layer 22, and the third recording layer 23 were in a decolored state, and then used as a sample.

Comparative Example 2

The reversible multicolor recording medium 20 prepared in Comparative Example 1 above was heated using a ceramic bar heated to 180° C. and then cooled so that each of the first recording layer 21, the second recording layer 22, and the third recording layer 23 was preliminarily colored, and then used as a sample.

With respect to each of the above-prepared recording medium samples, a solid image was recorded in the Recording method 1 and Recording method 2 shown below, and evaluations were made in respect of the color tone measurement and the recording-erasing repetition properties.

(Recording Method 1)

The reversible multicolor recording medium samples prepared in Example 1 and Comparative Example 1 above were individually irradiated at an arbitrary position with semiconductor laser beams (wavelength: 795 nm; power: 300 mW; wavelength: 860 nm; power: 500 mW; wavelength: 980 nm; power: 550 mW; spot size: 20 μm×200 μm) individually or simultaneously while scanning the laser beams at a scanning rate of 4,000 mm/sec to record a line on the sample. This recording was repeated at intervals of 20 μm, so that a solid image was recorded on each sample.

(Recording Method 2)

The reversible multicolor recording medium samples prepared in Example 2 and Comparative Example 2 above were individually irradiated at an arbitrary position with semiconductor laser beams (wavelength: 795 nm; power: 300 mW; wavelength: 860 nm; power: 500 mW; wavelength: 980 nm; power: 550 mW; spot size: 50 μm×200 μm) individually or simultaneously while scanning the laser beams at a scanning rate of 4,000 mm/sec to record a line on the sample. This recording was repeated at intervals of 30 μm, so that a solid image was recorded on each sample.

(Measurement of Color Tone)

With respect to each of the samples recorded in the (Recording method 1) and (Recording method 2) above, a reflectance was measured by means of an autographic spectrophotometer having an integrating sphere, thus determining the chromaticity for D-light source of the recorded image.

(Evaluation of Repetition Properties)

A solid image was recorded on the reversible multicolor recording medium sample at an arbitrary position in the (Recording method 1) above, and then the recorded image was erased using a ceramic bar at 120° C., and a sequence of this examination was repeated 100 times with respect to the same position of each sample. The color tone of the resultant recorded position was evaluated by the method shown in the (Measurement of color tone) above.

[Evaluation Result 1]

With respect to each of the reversible multicolor recording media prepared in Example 1 and Comparative Example 1 above, recording was conducted in the (Recording method 1) above and the color tone of the recorded image was evaluated, and the results are shown in Table 1 below.

In the Table 1 below, the laser used is indicated by "0", and the laser which was not used is indicated by "x".

TABLE 1

| | Wavelength of irradiating laser | | | Chromaticity | | | |
|---|---|---|---|---|---|---|---|
| Sample | 800 nm | 860 nm | 980 nm | L* | a* | b* | Color tone |
| Exp. 1 | ○ | x | x | 85.4 | 0.74 | 71.8 | Yellow |
| | x | ○ | x | 58.0 | 76.3 | −26.6 | Magenta |
| | x | x | ○ | 70.1 | −42.1 | −39.1 | Cyan |
| | ○ | ○ | x | 50.2 | 62.5 | 32.9 | Red |
| | x | ○ | ○ | 29.1 | 39.8 | −66.3 | Blue |
| | ○ | x | ○ | 54.1 | −55.2 | 25.6 | Green |
| | ○ | ○ | ○ | 27.2 | 2.91 | −5.04 | Black |
| | x | x | x | 97.4 | −3.06 | −3.02 | White |
| Comp. | x | x | ○ | 85.3 | 0.76 | 72.1 | Yellow |
| Exp. 1 | x | ○ | x | 73.2 | 27.06 | 40.0 | Red |
| | ○ | x | | 71.3 | −5.17 | 29.8 | Gray |

As can be seen from the Table 1 above, when the reversible multicolor recording medium in Example 1 was irradiated individually with the laser beams having three different wavelengths, only the predetermined recording layer having an absorption peak at each wavelength could be colored, thus obtaining sharp color tone and image. Further, when the recording medium was irradiated with a combination of two or more laser beams selected from the laser beams having three different wavelengths, the predetermined recording layers having absorption peaks at the wavelengths of the respective laser beams could be colored, so that a composite color, e.g., red, green, blue, or black was obtained, thus achieving sharp full color display.

By contrast, when the reversible multicolor recording medium in Comparative Example 1 was irradiated with a laser having a wavelength of 980 nm, the first recording layer 21 shown in FIG. 3 was colored to achieve yellow display, but, when the recording medium was irradiated with a laser having a wavelength of 860 nm, because the absorption spectrum of the dye is broad in the absorption peak on the shorter wavelength side as shown in FIG. 2, not only the second recording layer 22 but also the first recording layer 21 were colored, making the color tone red.

In addition, when the recording medium was irradiated with a laser having a wavelength of 800 nm, similarly not only the third recording layer 23 but also the first recording layer 21 and the second recording layer 22 were colored, making the color tone gray.

That is, in the reversible multicolor recording medium in Comparative Example 1, the recording layers other than the uppermost recording layer, namely, the second and third recording layers 22, 23 show in FIG. 3 could not be individually colored, causing the color display to be unclear.

[Evaluation Result 2]

With respect to each of the recording media in Example 2 and Comparative Example 2 above, recording was conducted in the (Recording method 2) above and the color tone of the recorded image was evaluated, the results are shown in Table 2 below.

In the Table 2 below, the laser used is indicated by "0", and the laser which was not used is indicated by "x".

TABLE 2

| | Wavelength of irradiating laser | | | Chromaticity | | | |
|---|---|---|---|---|---|---|---|
| Sample | 800 nm | 860 nm | 980 nm | L* | a* | b* | Color tone |
| Exp. 2 | ○ | x | x | 29.2 | 38.8 | −65.9 | Blue |
| | x | ○ | x | 54.6 | −54.2 | 25.6 | Green |
| | x | x | ○ | 50.6 | 64.5 | 31.8 | Red |
| | ○ | ○ | x | 71.1 | −42.1 | −38.7 | Cyan |
| | x | ○ | ○ | 85.0 | 0.74 | 71.6 | Yellow |
| | ○ | x | ○ | 57.5 | 76.0 | −25.6 | Magenta |
| | ○ | ○ | ○ | 95.4 | −3.10 | −3.00 | White |
| | x | x | x | 25.1 | 2.77 | −4.05 | Black |
| Comp. | x | x | ○ | 29.4 | 40.0 | −65.3 | Blue |
| Exp. 2 | x | ○ | x | 50.9 | −35.1 | −32.9 | Cyan |
| | ○ | x | | 41.3 | −10.2 | 16.8 | Gray |

As can be seen from the Table 2 above, when the reversible multicolor recording medium in Example 2 was irradiated individually with the laser beams having three different wavelengths, only the predetermined recording layer having an absorption peak at each wavelength could be decolored, thus achieving sharp display of a desired composite color. Further, when the recording medium was irradiated with a combination of two or more laser beams selected from the laser beams having three different wavelengths, the predetermined recording layers having absorption peaks at the wavelengths of the respective laser beams could be decolored to make desired color display, thus achieving sharp full color display as a whole.

By contrast, when the reversible multicolor recording medium in Comparative Example 2 was irradiated with a laser having a wavelength of 980 nm, the first recording layer 21 shown in FIG. 3 was decolored to achieve blue display, but, when the recording medium was irradiated with a laser having a wavelength of 860 nm, because the absorption spectrum of the dye is broad in the absorption peak on the shorter wavelength side as shown in FIG. 2, not only the second recording layer 22 but also the first recording layer 21 were decolored, making the color tone cyan.

In addition, when the recording medium was irradiated with a laser having a wavelength of 800 nm, similarly not only the third recording layer 23 but also the first recording layer 21 and the second recording layer 22 were decolored, making the color tone gray.

That is, in the reversible multicolor recording medium in Comparative Example 2, the recording layers other than the uppermost recording layer, namely, the second and third recording layers 22, 23 shown in FIG. 3 could not be individually decolored, causing the color display to be unclear.

[Evaluation Result 3]

With respect to the reversible multicolor recording medium in Example 1 above, a sequence of recording and erasing was repeated 100 times, and then the resultant recording medium was irradiated with laser beams respectively having three different wavelengths of 795 nm, 860 nm, and 980 nm to achieve color display, followed by evaluation of the chromaticity. The evaluation results are shown in Table 3 below.

TABLE 3

| | Wavelength of irradiating laser | | | Chromaticity after 100-time repetition | | | |
|---|---|---|---|---|---|---|---|
| Sample | 800 nm | 860 nm | 980 nm | L* | a* | b* | Color tone |
| Exp. 1 | ○ | x | x | 81.5 | 0.72 | 69.9 | Yellow |
| | x | ○ | x | 56.0 | 74.4 | −26.0 | Magenta |
| | x | x | ○ | 70.0 | −41.1 | −38.9 | Cyan |

As can be seen from the Table 3 above, in the reversible multicolor recording medium in Example 1, after repeating a sequence of recording and erasing 100 times, a desired recording layer can be colored by irradiation of a laser having a predetermined wavelength, achieving display with image quality equivalent to the initial quality.

INDUSTRIAL APPLICABILITY

In the reversible multicolor recording medium of the present invention, irradiation of an infrared ray having a selected wavelength selectively allows a desired recording layer to generate heat, so that reversible conversion of the recording layer between a colored state and a decolored state can be made, thus achieving sharp image display. In addition, after recording and erasing information repeatedly, image quality equivalent to the initial quality can be obtained on the recording medium.

Further, in the method of the present invention, by stacking the recording layers on one another on the supporting substrate so that the recording layer closer to the supporting substrate contains a light-to-heat transforming material having absorption at a longer wavelength, a high-quality image free from fogging can be recorded on the recording medium.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A reversible multicolor recording medium comprising:

a plurality of recording layers, each recording layer containing a reversible thermal coloring composition having a different coloring tone and each said recording layer containing a light-to-heat transforming material distributed therein, wherein the recording layers are formed to be separated from and stacked on a surface direction of a non-transparent supporting substrate; and said light-to-heat transforming materials contained in each of said recording layers each absorb infrared rays having different wavelength ranges to generate heat, respectively;

wherein an absorption peak wavelength of said light-to-heat transforming material contained in said recording layers is a longest wavelength at a layer formed nearest said non-transparent supporting substrate, and decreases in wavelength as the layer is closer to the surface layer in the stacked order.

2. The reversible multicolor recording medium according to claim 1, wherein at least one of said light-to-heat transforming materials is cyanine dyes or phthalocyanine dyes.

3. The reversible multicolor recording medium according to claim 1, wherein said plurality of recording layers are formed by stacking said recording layers via heat insulating layers, respectively.

4. The reversible multicolor recording medium according to claim 1 wherein a protective layer is formed as an uppermost layer.

5. The reversible multicolor recording medium according to claim 1, wherein said recording layers comprise a color-forming compound having an electron donating property and a develop/subtractive agent having an electron accepting property, and wherein said recording layers are reversibly changed to two states including a colored state and a decolored state by a reversible reaction between said color-forming compound having an electron donating property and said develop/subtractive agent having an electron accepting property.

6. A method for recording image information using a reversible multicolor recording medium, said reversible multicolor recording medium having one or more recording layers, each recording layer containing a reversible thermal coloring composition having a different coloring tone and each said recording layer containing a light-to-heat transforming material distributed therein, formed separated from and stacked on a surface direction of a non-transparent supporting substrate, said light-to-heat transforming materials contained in each of said recording layers each absorb infrared rays having different wavelength ranges to generate heat, respectively, and an absorption peak wavelength of said light-to-heat transforming material contained in said recording layers that is a longest wavelength at a layer formed nearest said non-transparent supporting substrate, and decreases wavelength as the layer is closer to the surface layer in the stacked order the method comprising:

setting the recording layers in a decolored state preliminarily by performing a heat treatment;

exposing said recording layers by irradiating with an infrared ray having a selected wavelength range corresponding to a selected recording layer, in accordance with predetermined image information; and allowing said recording layers to be selectively colored by generating to heat.

7. A method for recording medium recording image information using a reversible multicolor recording medium, said reversible multicolor recording medium having one or more recording layers, each recording layer containing a reversible thermal coloring composition having a different coloring tone and each said recording layer containing a light-to-heat transforming material distributed therein, formed separated from and stacked on a surface direction of a non-transparent supporting substrate, said light-to-heat transforming materials contained in each of said recording layers each absorb infrared rays having different wavelength ranges to generate heat, respectively, and an absorption peak wavelength of said light-to-heat transforming material contained in said recording layers that is a longest wavelength at a layer formed nearest said non-transparent supporting substrate, and decreases wavelength as the layer is closer to the surface layer in the stacked order, the method comprising:

setting the recording layers in a colored state preliminarily by performing a heat treatment;

exposing said recording layers by irradiating with an infrared ray having a selected wavelength range corresponding to a selected recording layer, in accordance with predetermined image information; and allowing said recording layers to be selectively decolored by generating to heat.

* * * * *